United States Patent
Travers et al.

(10) Patent No.: US 6,788,286 B2
(45) Date of Patent: Sep. 7, 2004

(54) CONTROLLER FOR GRAPHICAL DISPLAY

(75) Inventors: Paul Travers, Honeoye Falls, NY (US); Paul Churnetski, West Henrietta, NY (US); Dan Menachof, Rochester, NY (US); Mark Dunham, Rochester, NY (US)

(73) Assignee: Interactive Imaging Systems, Inc., Rochester, NY (US)

( * ) Notice: Subject to any disclaimer, the term of this patent is extended or adjusted under 35 U.S.C. 154(b) by 290 days.

(21) Appl. No.: 09/848,074

(22) Filed: May 3, 2001

(65) Prior Publication Data

US 2002/0163496 A1 Nov. 7, 2002

(51) Int. Cl.[7] .................................................. G09G 5/00
(52) U.S. Cl. ...................................... 345/156; 345/169
(58) Field of Search ........................... 345/88, 169, 156, 345/87, 161, 84, 100, 82, 32, 565; 455/556, 566; 359/811; 353/122

(56) References Cited

U.S. PATENT DOCUMENTS

| | | | | |
|---|---|---|---|---|
| 4,991,935 A | * | 2/1991 | Sakurai | 359/804 |
| 5,165,779 A | * | 11/1992 | Tortola et al. | 362/109 |
| 5,376,979 A | * | 12/1994 | Zavracky et al. | 353/122 |
| 5,485,318 A | * | 1/1996 | Lebby et al. | 359/811 |
| 5,539,578 A | * | 7/1996 | Togino et al. | 359/630 |
| 5,818,634 A | * | 10/1998 | Richard et al. | 359/565 |
| 5,982,355 A | * | 11/1999 | Jaeger et al. | 345/161 |
| 6,085,112 A | * | 7/2000 | Kleinschmidt et al. | 455/556 |
| 6,366,267 B1 | * | 4/2002 | Song et al. | 345/82 |
| 6,452,577 B1 | * | 9/2002 | Gale et al. | 345/87 |
| 6,486,862 B1 | * | 11/2002 | Jacobsen et al. | 345/88 |

* cited by examiner

*Primary Examiner*—Vijay Shankar
*Assistant Examiner*—Nitin Patel
(74) *Attorney, Agent, or Firm*—Stephen B. Salai; Roger Aceto; Harter, Secrest & Emery LLP

(57) ABSTRACT

A controller for a graphical display. The controller is preferably integral to a computing device that is operable while being held in one hand. The user views the display through a magnifying lens while controlling the display and controllable elements on the display with the thumb, either by actuating a push plate or by moving the thumb over a window in the push plate.

29 Claims, 5 Drawing Sheets

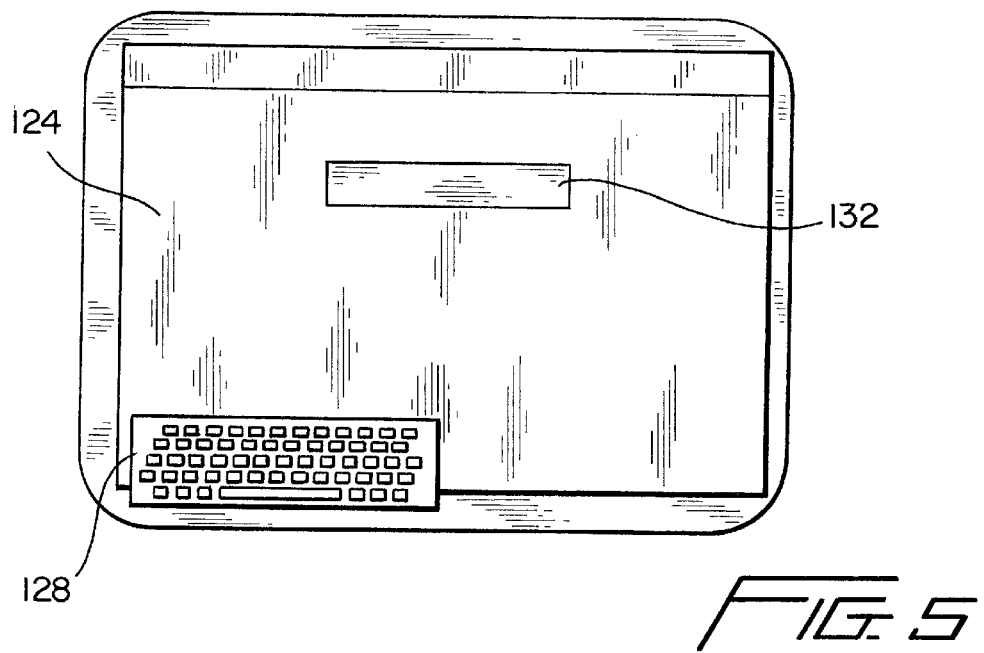
FIG. 5
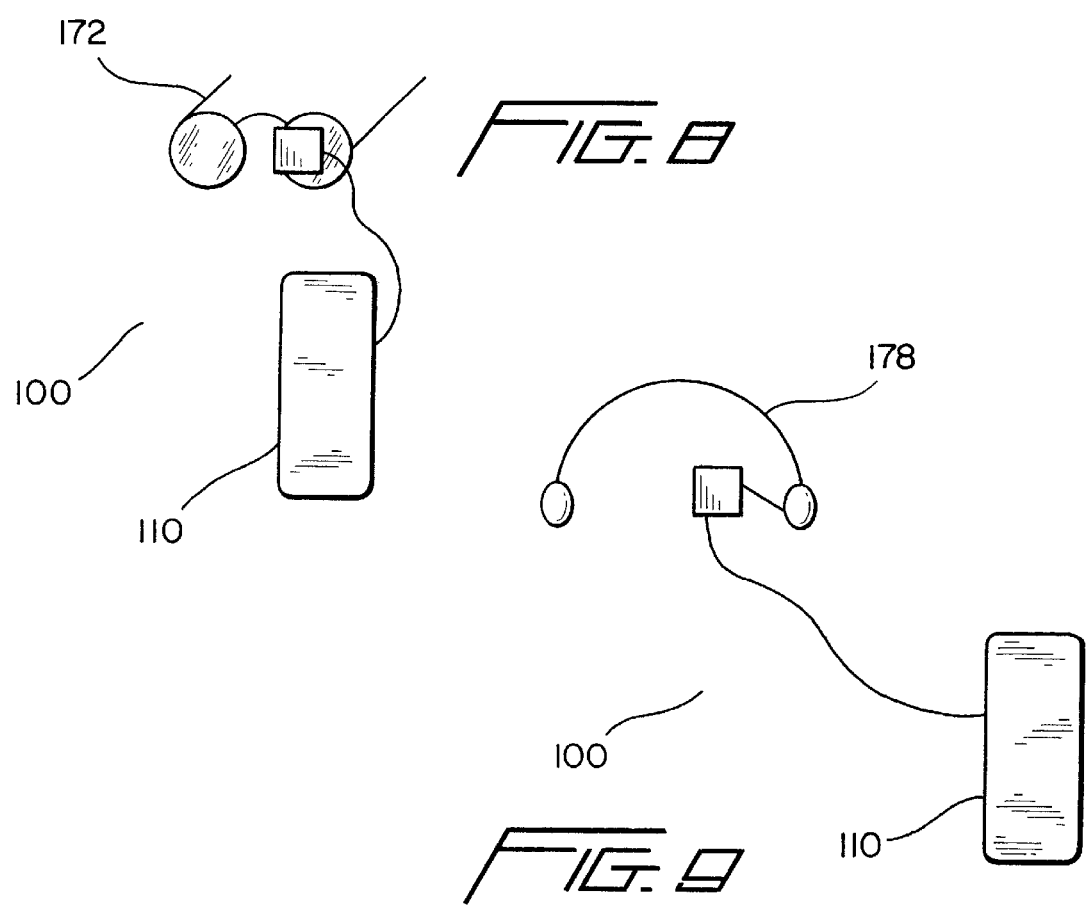
FIG. 8
FIG. 9

CONTROLLER FOR GRAPHICAL DISPLAY

FIELD OF THE INVENTION

The invention pertains to a device for controlling a graphical display, and in particular to a handheld device.

BACKGROUND OF THE INVENTION

Since the widespread adoption of computers, the mouse has been commonly used to control computer displays. Most commonly, the mouse includes a ball largely encased in a housing, a small portion of the ball projecting through an opening at the bottom of the housing. A user typically translates the mouse across a mouse pad causing the ball to rotate, thus registering the direction and distance through which the mouse is translated. The mouse is capable of processing this information and providing corresponding input to the display, for example by causing a cursor to move from a first location to a selected second location on the display. A typical mouse also has at least one control button allowing the user to perform a variety of functions. Variations of the technology for the mouse have been developed. For example, in certain laptop computers the ball is embedded at a specific location on a keyboard and rotated by the user's finger. The mechanical mouse has the disadvantage that sometimes, such as when the mouse mechanism needs to be cleaned, the cursor does not respond in the expected fashion and it can therefore be awkward to use.

More recently, an optical mouse has been developed. This uses an optical detector system instead of a ball, which eliminates the use of a mechanical feature with its inherent disadvantages. Through an opening in the bottom, the optical mouse can detect the translation of the mouse across a surface in a way that mimics its predecessor. Earlier versions of the optical mouse required a specially marked surface, with features that could be easily detected. More recent versions of the optical mouse can be used on a wide variety of surfaces including regular mouse pads, the only requirement being that the surface should have features distinguishable by the detector. In practice all except quite highly polished surfaces can be distinguished. The optical mouse has spacers on the bottom to separate its main housing from the mouse pad or equivalent surface. For practical reasons, the optics of the optical mouse are focused at a plane below the bottom of the mouse, and the spacers compensate for this. Also, the spacers are made of a smooth material such as Teflon, in order to reduce the friction between the mouse and the mouse pad. In fact, spacers are also used on the mechanical mouse in order to stabilize the mouse on the mouse pad and to reduce friction.

To date, both the mechanical mouse and the optical mouse have required a dedicated surface on which to move. Such a surface typically requires desktop space beyond that taken up by an associated computer. Alternatively, more compact devices include a joystick and a tracking ball. Absent other means of control, a keyboard can also be used to perform the same functions, albeit not as conveniently. While with the joystick the movement of the stick can be compared to the translation of the mouse, it is often considered less convenient. The tracking ball has been incorporated directly into devices such as laptop computers. This has the advantage of saving space but shares the same disadvantage as the mechanical mouse.

Therefore, there is a need for a controller that combines the advantages of the mouse while avoiding its disadvantages.

There is further a need for a controller that is free standing, readily portable, and able to communicate with a variety of personal communication devices.

There is still a further need for a controller which is operable even when there is no fixed surface available for its operation.

There is yet a further need for a controller which can be built into a variety of personal communication devices and provide the user with a convenient way of controlling such devices.

BRIEF DESCRIPTION OF THE INVENTION

The invention is a controller based on the principles of the optical mouse. However, instead of the controller being translated over a surface, an input article is translated over the controller. More particularly, a user's finger or thumb is translated over a window of the controller. This allows the invention to have a variety of configurations. The window is located at a window aperture of a movable push plate, which when depressed by the user at an appropriate location actuates a corresponding switch, which for example allows the user to select an item on the display or to scroll the display.

The controller can be free-standing and used with a selected Personal Communications Device (PCD). Such a PCD could be a Personal Internet Browser (PIB) or a Personal Digital Assistant. The controller could communicate with the PCD either through a wired connection or by a wireless connection. In the context of this application, a wired connection is understood to include a fiber optic connection.

Further, the controller could be incorporated, for example, into the housing of a PCD or a portable computer. It could further be combined into the housing of a keyboard or a joystick. Again, the controller would be operated with the finger or thumb.

BRIEF DESCRIPTION OF THE DRAWINGS

FIG. 8 is a schematic view of the controller with a wired connection to an independent computing device;

FIG. 9 is a schematic view of the controller with a wireless connection to the independent computing device;

DETAILED DESCRIPTION OF THE INVENTION

Figure 1:
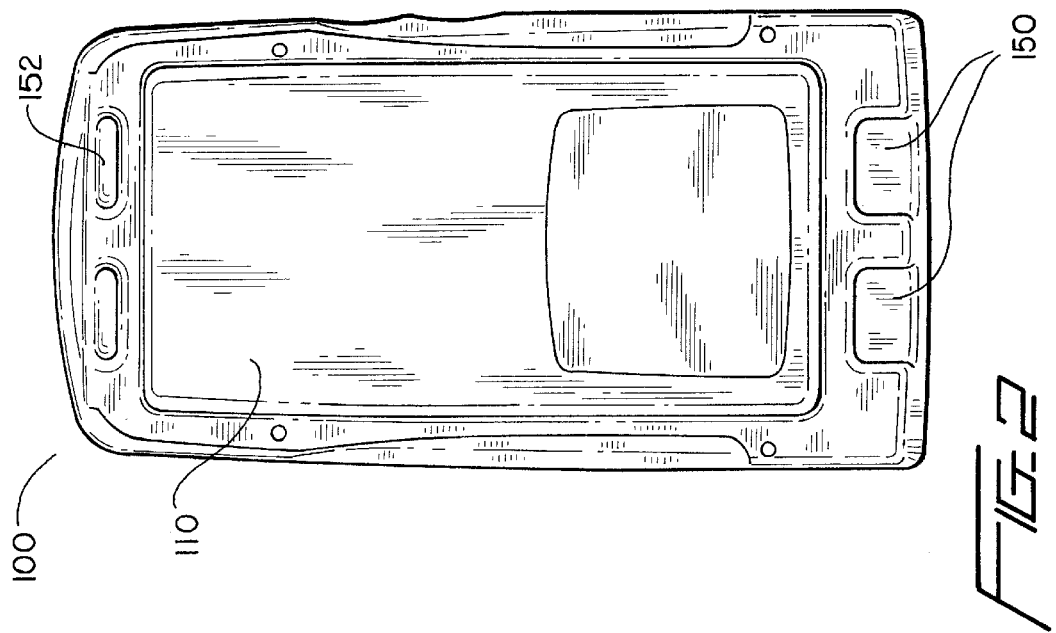
FIG. 1 is a schematic side view of elements of a controller connected to a graphic display.

Referring to the drawings, a tracking device or controller 100 for a computing apparatus includes a housing 110. In a preferred embodiment, the controller 100 is integral to a computing device 200 which has a graphic display 150. Alternatively, the controller 100 may communicate with a distinct computing device 210 through a wired connection 160 or a wireless connection 162.

A floating, i.e., movable push plate 120 with a window aperture 122 is located in the housing 110. A window 130 is normally located in the window aperture 122. The push plate 120 and the aperture 122 are generally circular and concentric, typically measuring about 40 mm and 4 mm across respectively.

Residing inside the housing 110 and directly aligned with the window 130 is a detector 132 including an optical element 134 a digital camera or imager 138, a signal processor 142 and a signal converter 144, as shown in FIG. 1. A light source 136 also resides within the housing 110. The optical element 134 is normally a lens, but it can include an optical fiber, a mirror or a prism. Also provided within the housing is a power source (not shown). This can either be an electrical cord from an external supply or a battery. The detector 132 serves to detect the translation of an object across the window 130. In the present invention the object is intended to be a user's finger and particularly a thumb 180, and the detector 132 can track a pattern thereof which would normally be referred to as a thumbprint. However, the object can be any article having features that can be tracked by the detector. Such features might be etched, cut, printed or otherwise marked on the object; in fact the detector 132 is capable of responding to the motion of almost any kind of surface, with a particular exception of highly polished surfaces.

Figure 2:
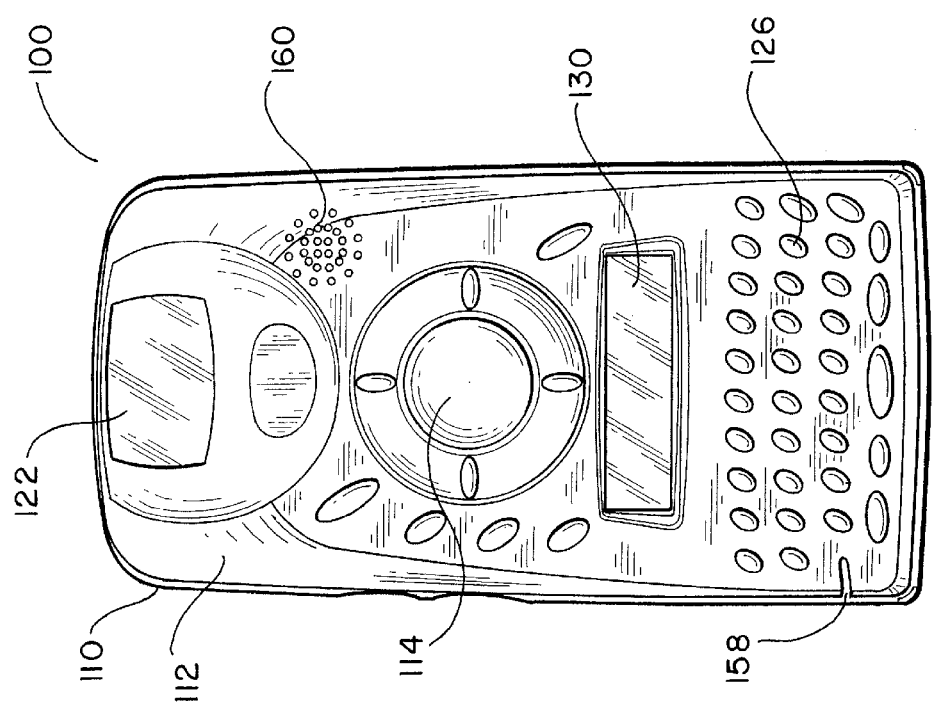
FIG. 2 is a schematic exploded view of elements of a push plate and of switches intended for actuation thereby.
Figure 3:
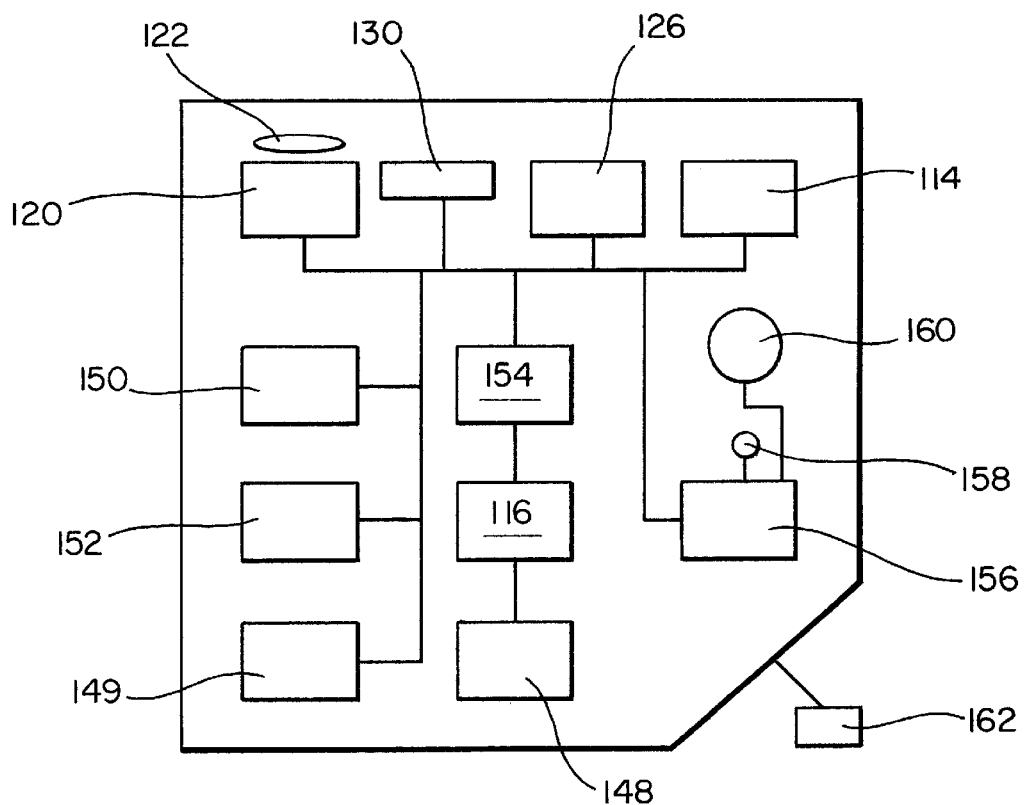
FIG. 3 is a plan view of the push plate elements and switches.

The push plate 120 is usually made up of independently movable elements; preferably, there are two concentric elements, an inner element 124 and an outer element 126, as shown in FIGS. 2 and 3. The inner element 124, which is typically about 20 mm across, is normally coupled to a switch 128 within the housing 110, while the outer element 126 is normally coupled to four further switches 128. The push plate elements 124 and 126 are mounted so that the user can independently actuate each switch 128 by depressing a corresponding portion of the push plate. Preferably, depressing the inner element 124 provides the user with a "select" function similar to left-clicking a conventional mouse. The switches beneath the outer element are placed in a roughly circular pattern 90° apart, and depressing an appropriate quadrant of the outer element 126 allows the user to scroll the display 150 in a corresponding direction. Although the particular example of the inner and outer push plate elements 124 and 126 has been described, it is understood that the push plate 120 can be differently configured; for example, it may have a plurality of elements divided along radial lines. It is stressed that the movable elements of the push plate 120 are mounted in the housing 110 so that they can be depressed specifically at the location of whichever switch 128 the user needs to actuate.

FIGS. 2 and 3 show the concentric push plate elements 124 and 126 with extending tabs 127, each of which rests on the appropriate switch 128. As an alternative to providing a distinct push plate 120, the controller 100 could be constructed so that the window 130 itself floats on the switches. As a further alternative to the push plate 120, the window 130 would not be movable, and there would be no independent switch 128. Instead, the window would have a pressure-sensitive surface which would respond to the user exerting pressure with the thumb 180. In yet a further alternative, the push plate 120 would not float on switches but would itself have a pressure-sensitive surface capable of responding to pressure from the thumb 180.

Preferably, the housing 110 has a concave area 112 surrounding the push plate 120 to provide a contour which comfortably accepts the thumb 180. Optionally the push plate 120 may itself be concave also.

The light source 136 is typically a light emitting diode, light from which is directed via a light pipe 140 through the window 130 to illuminate the thumb 180. Light from the thumb 180 is reflected back through the window 130 and is focussed on the imager 138 by the optical element 134. When the thumb 180 is translated from a first position to a second position across the window 130, it reflects a varying signal to the imager 138, which feeds the signal to a signal processor 142. The signal processor 142 detects the variations of the signal, and distinguishes the direction and distance of a given thumb-stroke. The processed signal is fed to the signal converter 144; the latter is a serial or quadrature converter which converts signal into a form which can be used to control the display 150.

The signal from the signal processor 142 serves as the input to control a controllable element such as a cursor 152 in the display 150. In other words, the cursor 152 is translated on the display 150 in response to the translation of the thumb 180 on the window 130. It is understood that in the context of this invention, the controllable element could be something other than the cursor 152. For example, in a computer game the user may change an apparent vantage-point from which a simulated object is viewed, or may change the apparent direction of travel of a simulated vehicle.

The controller 100 may be programmed to operate either in a linear or a non-linear mode. In the linear mode, the movement of the cursor 152 is linearly related to the translation of the user's thumb 180. In the non-linear mode, the distance moved by the cursor 152 increases relative to the translation of the thumb 180 towards the end of the thumb-stroke. The user can change from one mode to the other by entering appropriate commands in the display 150, for example by interacting with a dialog box. In the linear mode, the cursor ceases to move when the thumb is no longer moved. By contrast, in the non-linear mode, the cursor may continue to move in response to a longer thumb-stroke, even when the thumb itself has ceased to move.

Although the controller 100 can be designed to operate with visible light, infrared light is preferred, the window 130 being transparent to infrared light and the light source 136 being an infrared LED. If the imager 138 were sufficiently sensitive to infrared radiation, the light source 136 could be eliminated, since heat from the user's thumb 180 would provide sufficient energy for the imager 138 to detect the motion of the thumb 180.

When the push plate 120 is present, the window 130 is normally a flat piece of material such as glass. However, the window 130 is not strictly necessary, since the aperture 122 of the push plate 120 would provide the necessary light path between the thumb 180 and the imager 138.

Figure 4:
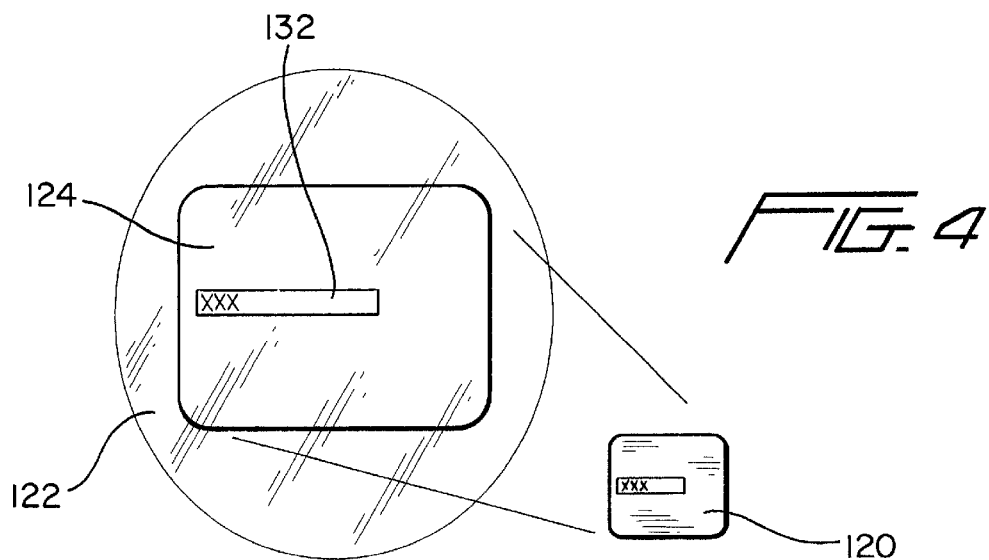
FIG. 4 is a schematic side view of a computing device including the controller and the display.
Figure 5:
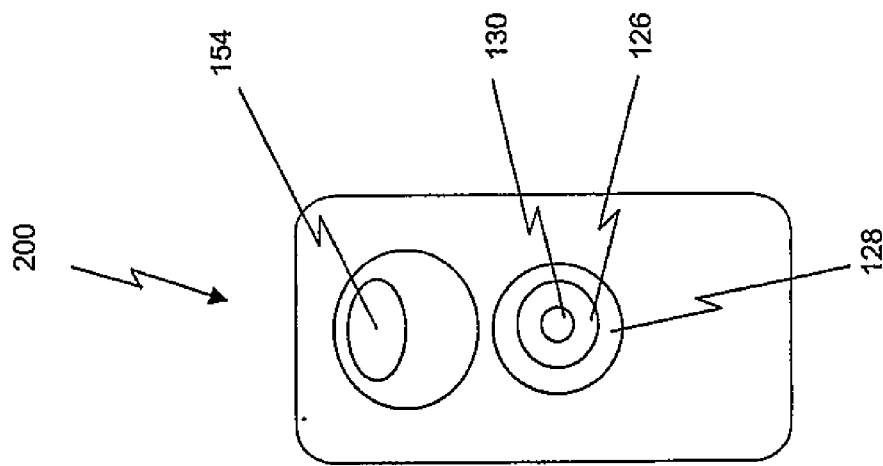
FIG. 5 is a schematic front view of the computing device of FIG. 2.
Figure 4:
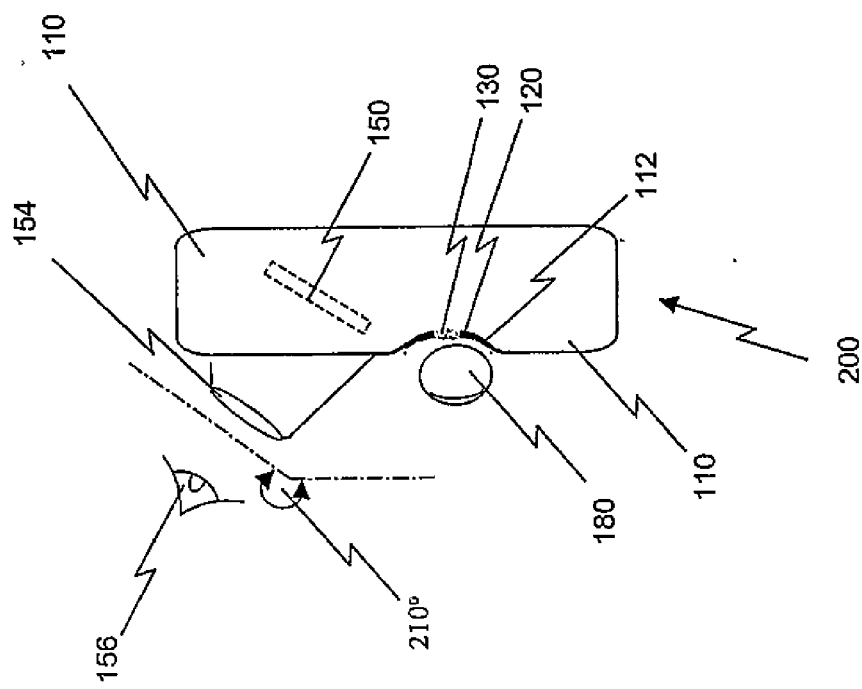
Figure 11:
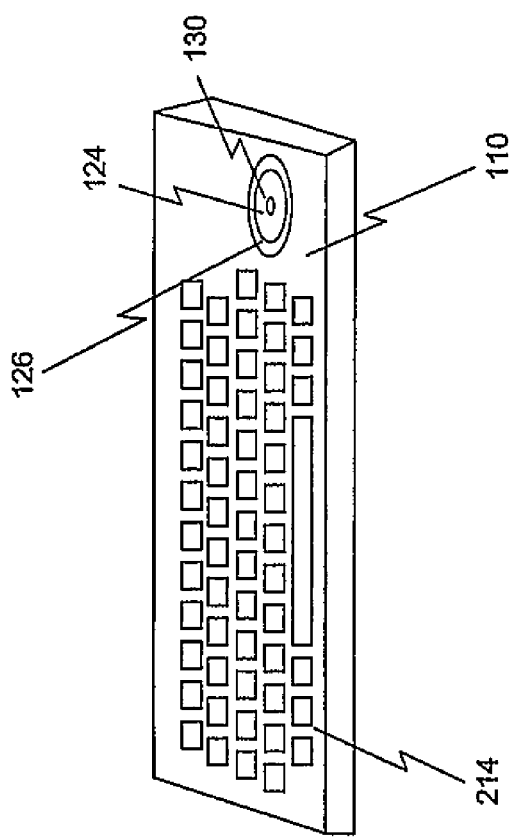
Figure 10:
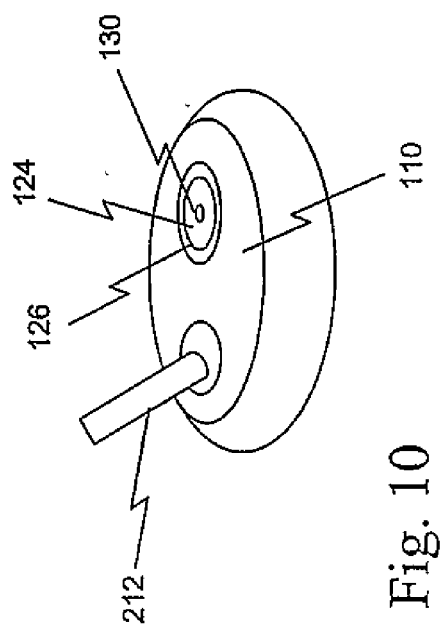

As has been mentioned, in the preferred embodiment, the controller 100 is incorporated into the computing device 200, which in particular is a PIB. Referring to FIGS. 4 and 5, an eyepiece or magnifying lens 154 is set into the surface of the housing 110 in alignment with and generally parallel to the display 150 which is recessed within the housing 100. The user views the display 150 by placing an eye 156 close to the magnifying lens 154. In a particular configuration, the display appears as a virtual 21" (0.53 m) 640×480 pixel screen viewed from a distance of 33" (0.84 m).

In the PIB 200, the display 150 and magnifying lens 154 may be in planes parallel with the push plate 120, but they are preferably angled relative to the push plate 120 as shown in FIG. 4. This provides that when the user's line of sight is approximately normal to the display, the user can comfortably grip and operate the PIB 200. This can be achieved if the external angle between the display 150 and the push plate 120 is about 210°. In fact the external angle may be as high as 270°, i.e, the display 150 is perpendicular to the push plate 120. In a further embodiment, the display 150 and magnifying lens 154 are together tiltable relative to the push plate 120. The user may select to have the display 150 facing in the same direction as, or perpendicularly to, the push plate 120, or facing in any intermediate direction.

Figure 7:
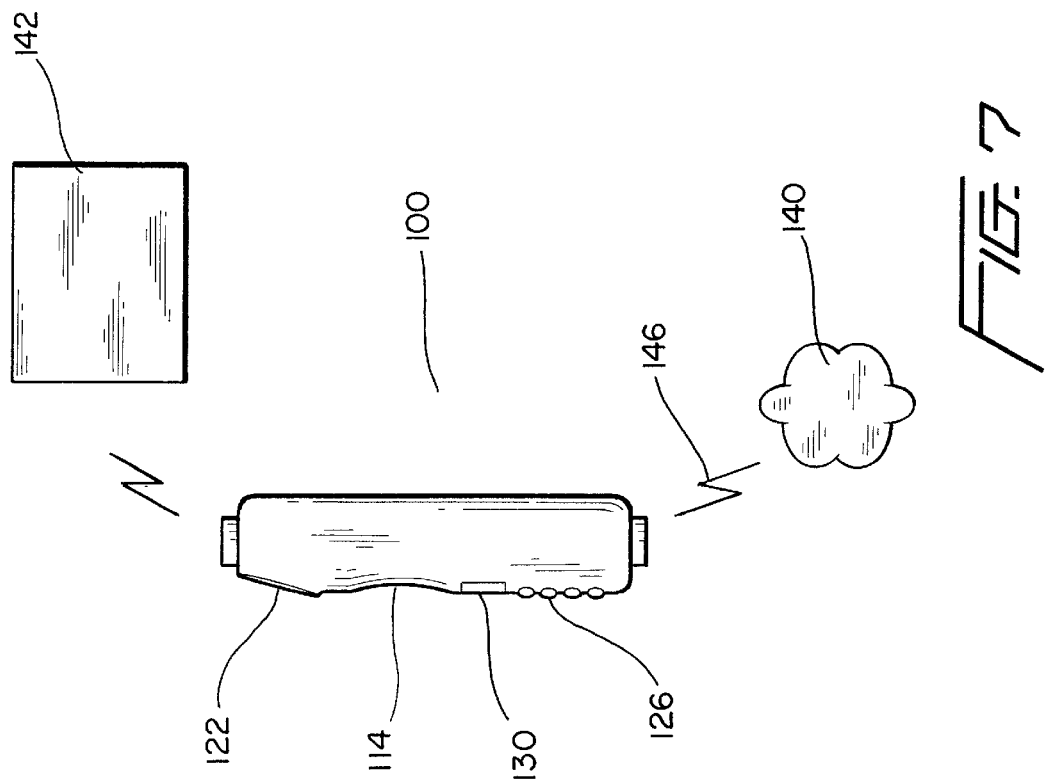
FIG. 7 is a schematic view of the computing device with wireless connections to a network and a data input device.
Figure 6:
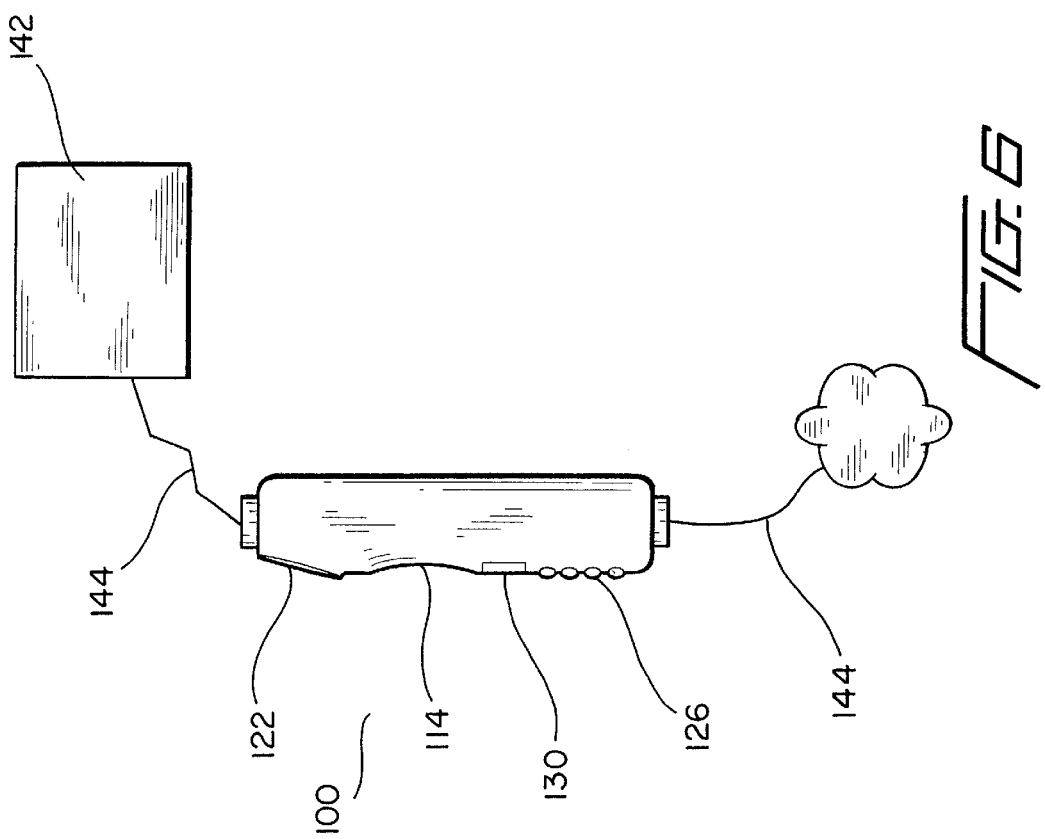
FIG. 6 is a schematic view of the computing device with wired connections to a network and a data input device.

The PIB 200 preferably has at least one communications port 190. Normally two such ports are provided, as shown in FIGS. 6 and 7. A first port provides access to a network 170 such as the Internet, Intranets or Wireless LAN by coupling with a suitable device, for example a computer, modem or cell phone. A second port for acquiring data from a data input device 172 which can for example be a bar code scanner, digital camera, digital or analog acquisition system, serial communications channel or parallel communications channels. The ports 190 and the entities which they communicate can be connected by wired connections 160 or wireless connections 162.

Figure 11:
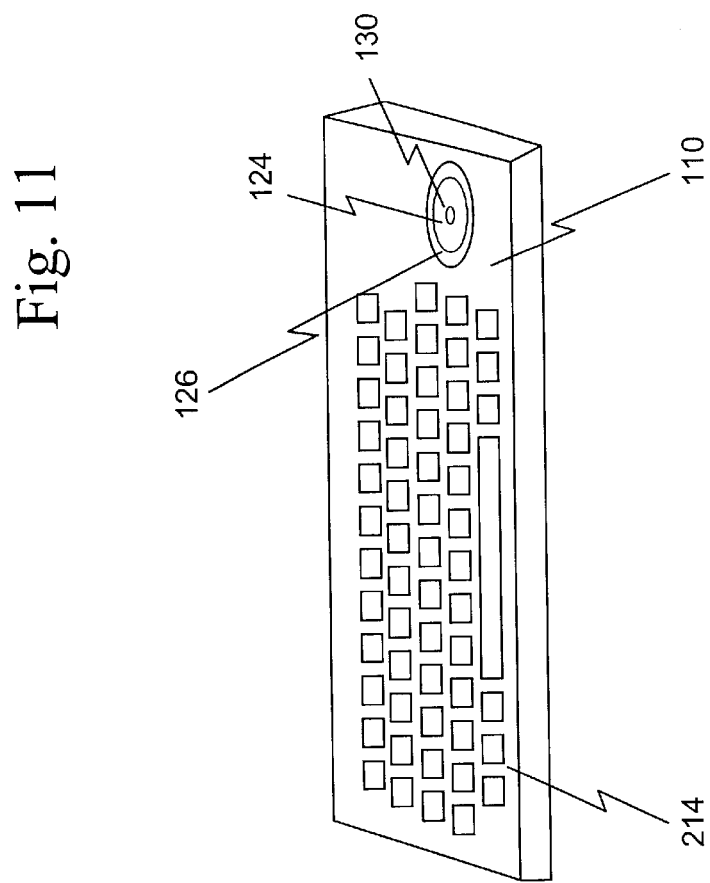
FIG. 11 is a schematic view of a keyboard having the controller incorporated therein.
Figure 10:
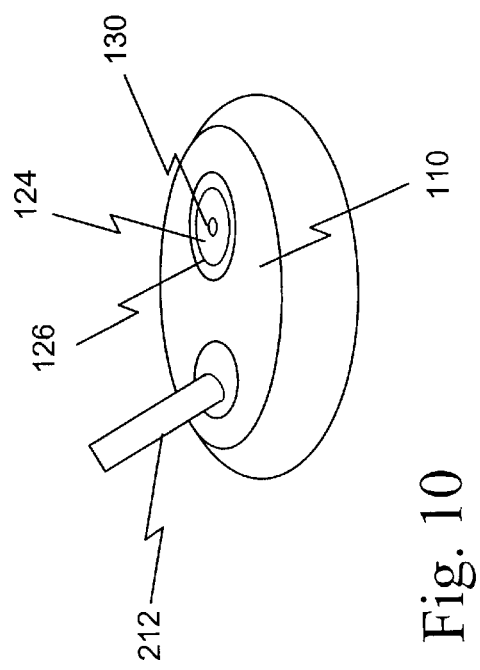
FIG. 10 is a schematic view of a joystick having the controller incorporated therein.
Figure 1:
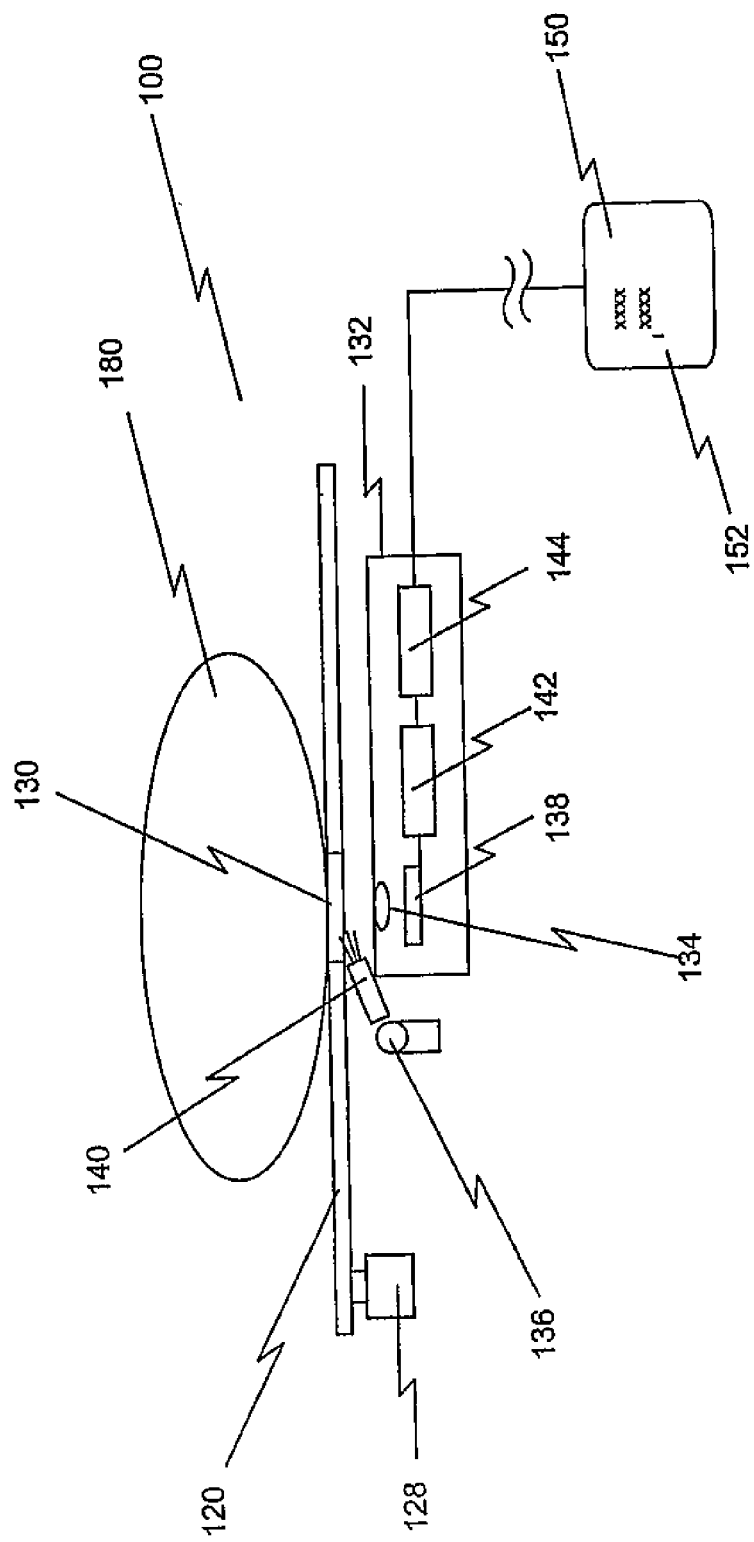

The controller 100 can be used in other configurations. As seen in FIGS. 8 and 9, it may for example be self-contained and communicate with a distinct computing device 210. This can for example can be a monocular web access device or a binocular web access device such as are typically worn on the user's head. The controller 100 could be carried on the user's person. It could for example be attached to a belt by a belt-clip and be removed for use when desired. It would then communicate with the web access device either through the wired connection 160 or wireless connection 162. The controller 100 could also be incorporated into a computer input device such as a joystick 212 or a keyboard 214, as depicted in FIGS. 10 and 11.

In FIG. 1, the detector 132 is shown as being spaced apart from the push plate 120 and window 130. However, it would be possible to have the detector fixedly attached to the push plate 120, in which case it would move together with the push plate 120. This would provide an economical use of space.

The invention is used as follows; it is assumed that the controller is 100 is programmed to operate in non-linear mode. Assuming that the controller 100 is integral to the PIB 200, the user grasps the PIB 200 in one hand with the thumb 180 resting in a first position on the window 130, and brings the PIB 200 so that the magnifying lens 154 is close to one eye 156 and the display is observed as a virtual image. To move the cursor 152, the user's thumb 180 is translated in the desired direction across the window 130 to a second position, when the thumb 180 is lifted off the window 130. Depending on how far the thumb 180 has been translated, the cursor 152 assumes a rest position when this thumb-stroke is completed or shortly thereafter. If this rest position is not the desired position, the thumb 180 is lifted off the window 130 and returned to the first position, its translation across the window 130 being repeated until the desired rest position is reached. Software associated with the controller 100 can be designed so that the cursor 152 will not respond to a sudden change in direction as when the user returns the thumb 180 from the second to the first position, even if the thumb 180 remains in contact with the window 130. To perform the "select" function on the display 150, the user simply depresses the inner element 124 with the thumb 180. To perform a desired scrolling operation, the user depresses the appropriate quadrant of the outer element 126 with the thumb 180. Any desired sequence of operations may be performed by translating the thumb 180 across the window 150 or by appropriately depressing an element of push plate 120 with the same thumb 180. In no case does the user have to perform any movement other than a slight movement of the thumb 180. In particular, it is unnecessary for the user to alter the grip of the PIB 200.

It is understood that the PIB 200 has features known in the art which are not shown in the drawings. For example, it has a power switch, a speaker, a stereo output jack and indicia, including particularly such indicia as are required to guide the user in its operation.

The advantage of the invention in the preferred embodiment is that the PIB 200 is fully operable with one hand. In other words, the user can grip the PIB 200 in the hand while simultaneously viewing the display 150 and controlling it with the thumb 180.

In the embodiment in which the controller 100 is self-contained and communicates with the distinct computing device 210, the user is not confined to a desktop or other stationary point of reference, and is therefore free to control the computing device 210 from any selected location.

While we have described the invention in connection with certain embodiments, we are aware that numerous and extensive departures may be made therein without however departing from the spirit of the invention and the scope of the appended claims.

We claim:

1. A hand held computing device, having:
   (a) a housing;
   (b) a movable push plate in the housing, the push plate having a window aperture and at least one movable element;
   (c) a window in the window aperture;
   (d) a switch coupled to the push plate so that the switch is actuated when the push plate is moved;
   (e) an imager within the housing, the imager detecting through the window a translation of an object between a first position and a second position and generating a signal in response thereto;
   (f) a magnifying lens in the housing;
   (g) a display recessed within the housing in alignment with the magnifying lens, the display having a controllable element which responds to the signal from the imager, the display further responding to the actuation of the switch.

2. The computing device of claim 1, wherein the display is angled relative to the push plate.

3. The computing device of claim 2, wherein the display has an external angle of at least 210° relative to the push plate.

4. The computing device of claim 2, wherein the display is tiltable between a first orientation and a second orientation relative to the push plate.

5. The computing device of claim 4, wherein the display in the first orientation faces in the same direction as the push plate and in the second orientation faces perpendicularly to the push plate.

6. The computing device of claim 1, wherein the housing has a concave area surrounding the push plate.

7. The computing device of claim 1, wherein the push plate is concave.

8. The computing device of claim 1, having a first element coupled to at least one first switch and a second element coupled to at least one second switch.

9. The computing device of claim 1, wherein the controllable element moves in a linear relationship to the translation of the object.

10. The computing device of claim 1, wherein the controllable element moves in a non-linear relationship to the translation of the object.

11. The computing device of claim 1, wherein the controllable element moves at a rate which increases relative to the translation of the object as the object approaches the second position.

12. The computing device of claim 1, further having at least one communications port.

13. A controller for a hand held display, comprising:
   (a) a push plate having a window aperture and at least one movable element;
   (b) a switch coupled to the push plate so that the switch is actuated when the push plate is moved; and
   (c) a detector aligned with the window aperture, the detector responding through the window aperture to a translation of an object, wherein the detector including an imager and an optical element through which passes an optical signal from the object to the imager.

14. The controller of claim 13, including a window in the window aperture.

15. The controller of claim 14 having also a light source illuminating the object through the window.

16. The controller of claim 14, wherein the optical element includes one of a lens, a mirror, a prism and an optical fiber.

17. The controller of claim 14, including a light source that emits visible light and the window and the optical element are transparent thereto.

18. The controller of claim 14, including a light source that emits infrared light and the window and the optical element are transparent thereto.

19. The controller of claim 14, wherein the imager responds to heat from a user's thumb.

20. The controller of claim 14, wherein the detector is fixedly attached to the window.

21. The controller of claim 14, wherein the detector is spaced apart from the window.

22. A controller for a computing device, having:
   (a) a housing;
   (b) a movable push plate in the housing, the push plate having a window aperture and at least one movable element;
   (c) a window in the window aperture;
   (d) a switch coupled to the push plate so that the switch is actuated when the push plate is moved;
   (e) an imager within the housing, the imager detecting through the window a translation of an object between a first position and a second position and generating a signal in response thereto; and
   (f) a computer input device in the housing, the computer input device selected from a group including a joystick and a keyboard.

23. A controller for a hand held display, comprising:
   (a) a movable window
   (b) a switch coupled to the push plate so that the switch is actuated when the push plate is moved; and
   (c) a detector aligned with the window aperture, the detector responding through the window aperture to a translation of an object, wherein the detector including an imager and an optical element through which passes an optical signal from the object to the imager.

24. A controller for a hand held display, comprising:
   (a) a window generating a signal in response to pressure applied thereon by a user; and
   (b) a detector aligned with the window aperture, the detector responding through the window aperture to a translation of an object, wherein the detector including an imager and an optical element through which passes an optical signal from the object to the imager.

25. The controller of claim 24, wherein the detector is an optical detector.

26. A controller for a hand held display, comprising:
   (a) a plate generating a signal in response to pressure applied thereon by a user, the plate having a window aperture; and
   (b) a detector aligned with the window aperture, the detector responding through the window aperture to a translation of an object, wherein the detector including an imager and an optical element through which passes an optical signal from the object to the imager.

27. The controller of claim 26, wherein the detector is an optical detector.

28. A method of controlling a display, comprising the steps of:
   (a) connecting a controller to the display, the controller having a movable push plate with a window and at least one movable element; at least one switch coupled to each movable element so that the switch is actuated when a corresponding portion of the movable element is depressed, the display being responsive to the actuation of each such switch; the controller providing to the display a signal which causes a controllable element in the display to move in response to the movement of a user's thumb across the window;
   (b) placing the thumb of the selected hand in a first position against the window;
   (c) translating the thumb in a selected direction across the window to a second position so that the controllable element moves in a corresponding direction to a rest position;
   (d) if the rest position is not a desired position, returning the thumb to the first position;
   (e) repeating steps (c) and (d) until the rest position is the desired position;
   (f) as necessary, actuating one of the switches with the thumb, thus producing a desired response of the display; and
   (g) repeating steps (b) through (f) as necessary.

29. A method of controlling a display in a computing device having a movable push plate with a window and at least one movable element; at least one switch coupled to each movable element so that the switch is actuated when a corresponding portion of the movable element is depressed, the display being responsive to the actuation of each switch; the controller providing to the display a signal which causes a controllable element in the display to move in response to the movement of a user's thumb across the window; the method comprising the steps of:
   (a) grasping the computing device with a selected hand
   (b) placing the thumb of the selected hand in a first position against the window;
   (c) translating the thumb in a selected direction across the window to a second position so that the controllable element moves in a corresponding direction to a rest position;
   (d) if the rest position is not a desired position, returning the thumb to the first position;
   (e) repeating steps (c) and (d) until the rest position is the desired position;
   (f) as necessary, actuating one of the switches with the thumb, thus producing a desired response of the display;
   (g) repeating steps (b) through (f) as necessary; and
   (h) releasing the computing device from the hand.

* * * * *

UNITED STATES PATENT AND TRADEMARK OFFICE
CERTIFICATE OF CORRECTION

PATENT NO. : 6,788,286 B2
APPLICATION NO. : 09/848074
DATED : September 7, 2004
INVENTOR(S) : Travers et al.

It is certified that error appears in the above-identified patent and that said Letters Patent is hereby corrected as shown below:

THE TITLE PAGE SHOWING AN ILLUSTRATIVE FIGURE, SHOULD BE DELETED AND SUBSTITUTE THEREFOR THE ATTACHED TITLE PAGE.

DELETE DRAWING SHEETS 1 – 5 AND SUBSTITUTE THEREFOR THE DRAWING SHEETS CONSISTING OF FIGS 1 – 11 AS SHOWN ON THE ATTACHED PAGES

Signed and Sealed this

Fifth Day of December, 2006

JON W. DUDAS
*Director of the United States Patent and Trademark Office*

(12) United States Patent
Travers et al.

(10) Patent No.: US 6,788,286 B2
(45) Date of Patent: Sep. 7, 2004

(54) CONTROLLER FOR GRAPHICAL DISPLAY

(75) Inventors: Paul Travers, Honeoye Falls, NY (US); Paul Churnetski, West Henrietta, NY (US); Dan Menachof, Rochester, NY (US); Mark Dunham, Rochester, NY (US)

(73) Assignee: Interactive Imaging Systems, Inc., Rochester, NY (US)

(*) Notice: Subject to any disclaimer, the term of this patent is extended or adjusted under 35 U.S.C. 154(b) by 290 days.

(21) Appl. No.: 09/848,074

(22) Filed: May 3, 2001

(65) Prior Publication Data
US 2002/0163496 A1 Nov. 7, 2002

(51) Int. Cl.$^7$ .................................. G09G 5/00
(52) U.S. Cl. ............................ 345/156; 345/169
(58) Field of Search ................... 345/88, 169, 156, 345/87, 161, 84, 100, 82, 32, 565; 455/556, 566; 359/811; 353/122

(56) References Cited

U.S. PATENT DOCUMENTS

| | | | |
|---|---|---|---|
| 4,991,935 A | * 2/1991 | Sakurai | 359/804 |
| 5,165,779 A | * 11/1992 | Tortola et al. | 362/109 |
| 5,376,979 A | * 12/1994 | Zavracky et al. | 353/122 |
| 5,485,318 A | * 1/1996 | Lebby et al. | 359/811 |
| 5,539,578 A | * 7/1996 | Togino et al. | 359/630 |
| 5,818,634 A | * 10/1998 | Richard et al. | 359/565 |
| 5,982,355 A | * 11/1999 | Jaeger et al. | 345/161 |
| 6,085,112 A | * 7/2000 | Kleinschmidt et al. | 455/556 |
| 6,366,267 B1 | * 4/2002 | Song et al. | 345/82 |
| 6,452,577 B1 | * 9/2002 | Gale et al. | 345/87 |
| 6,486,862 B1 | * 11/2002 | Jacobsen et al. | 345/88 |

* cited by examiner

Primary Examiner—Vijay Shankar
Assistant Examiner—Nitin Patel
(74) Attorney, Agent, or Firm—Stephen B. Salai; Roger Aceto; Harter, Secrest & Emery LLP

(57) ABSTRACT

A controller for a graphical display. The controller is preferably integral to a computing device that is operable while being held in one hand. The user views the display through a magnifying lens while controlling the display and controllable elements on the display with the thumb, either by actuating a push plate or by moving the thumb over a window in the push plate.

29 Claims, 5 Drawing Sheets

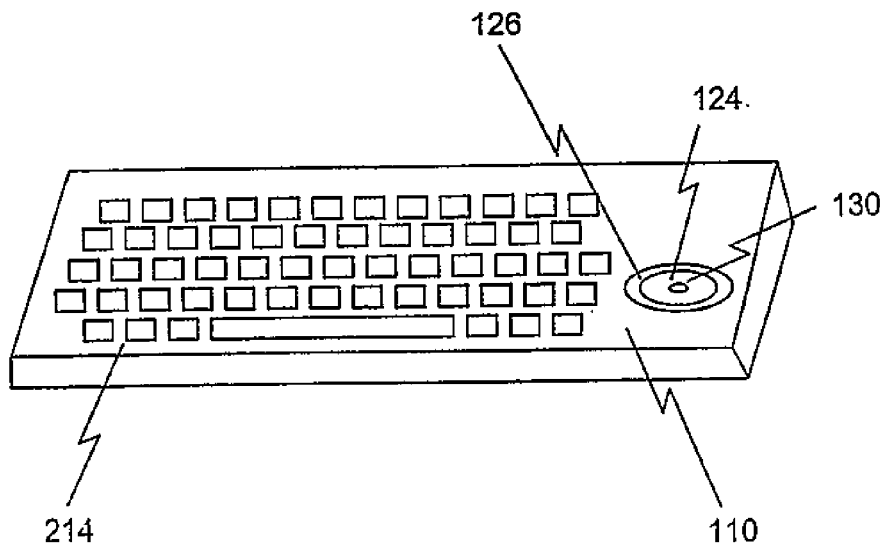

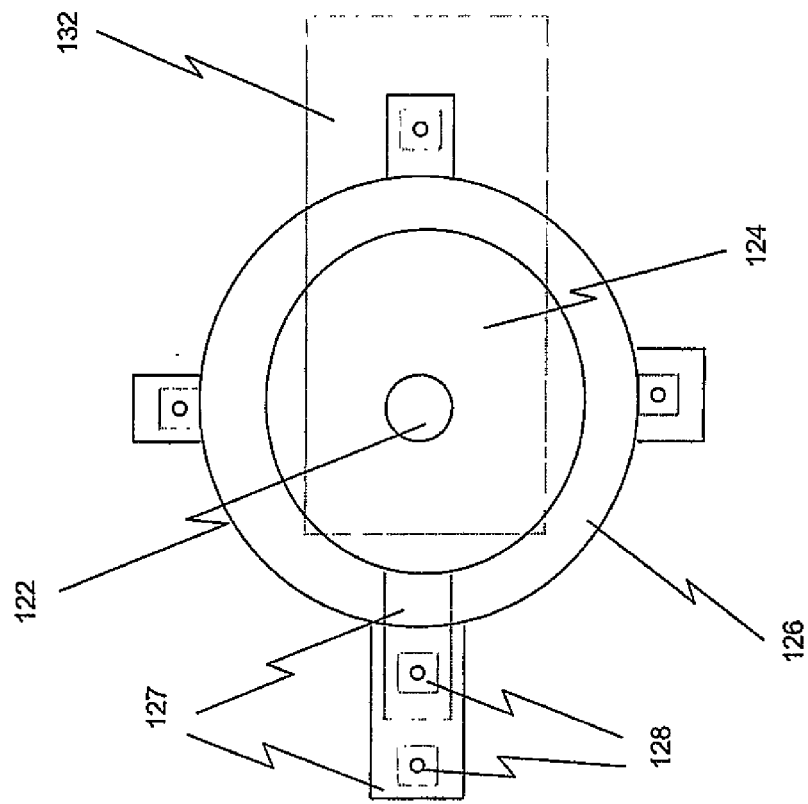
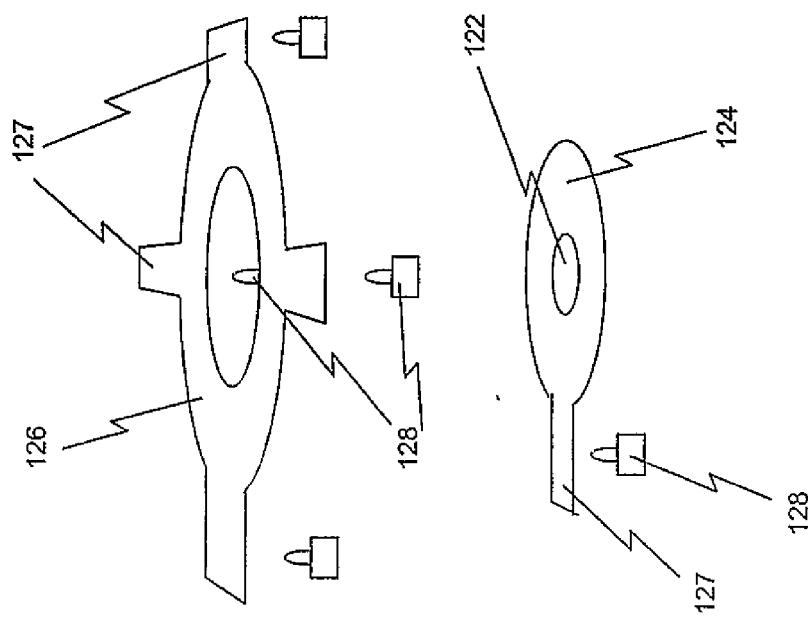

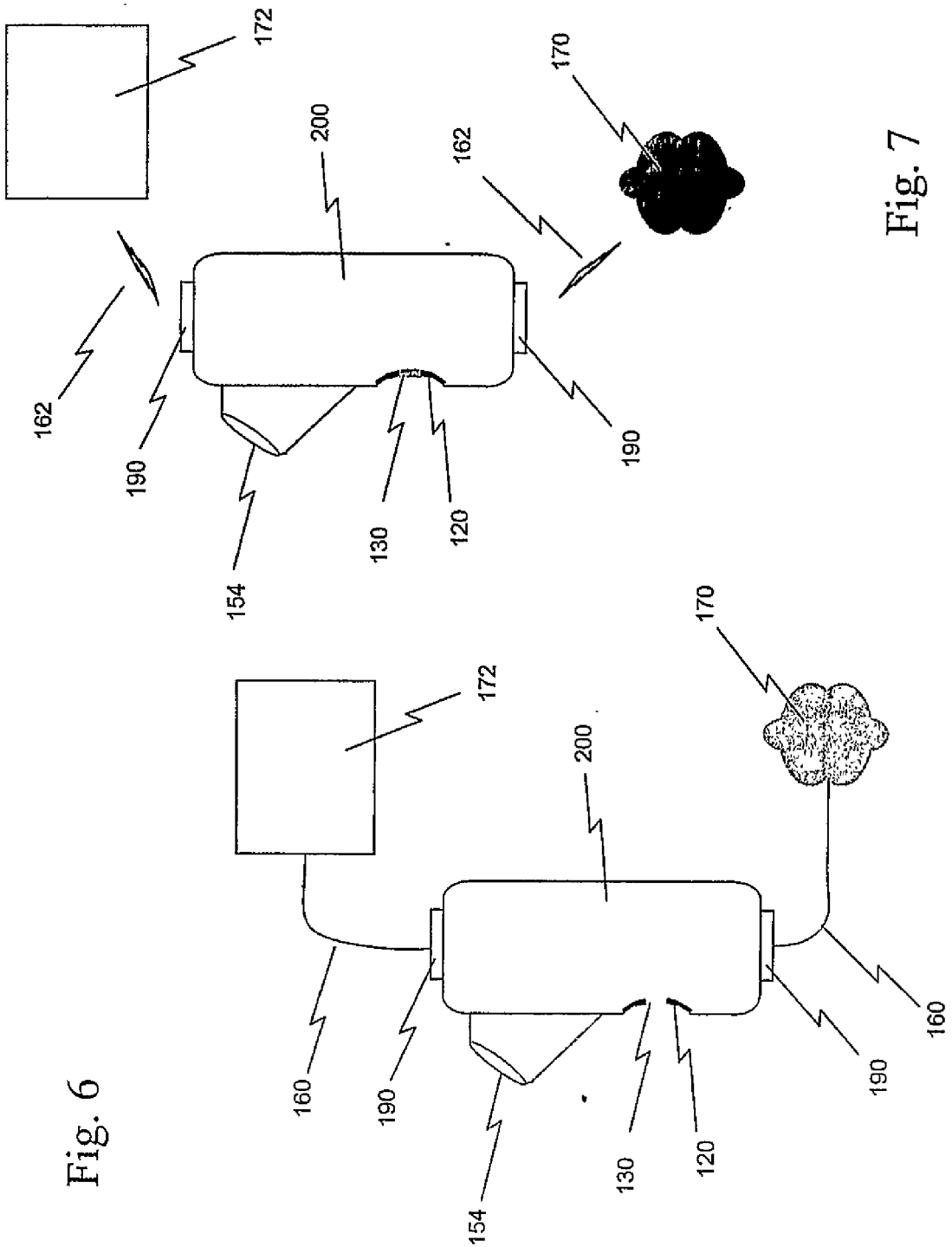

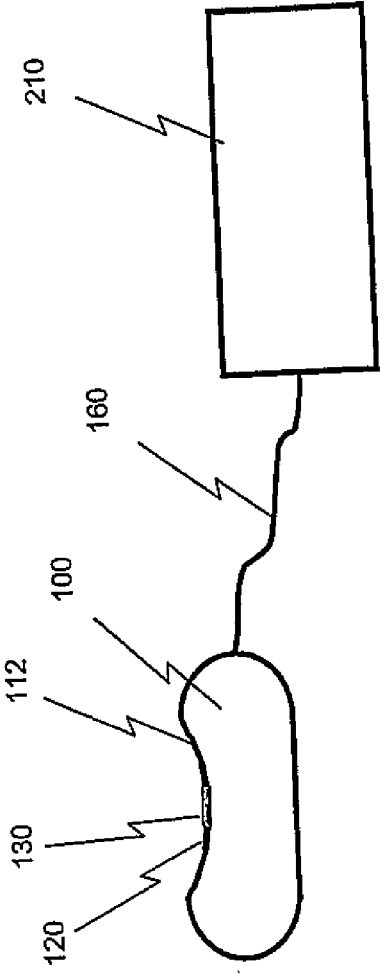
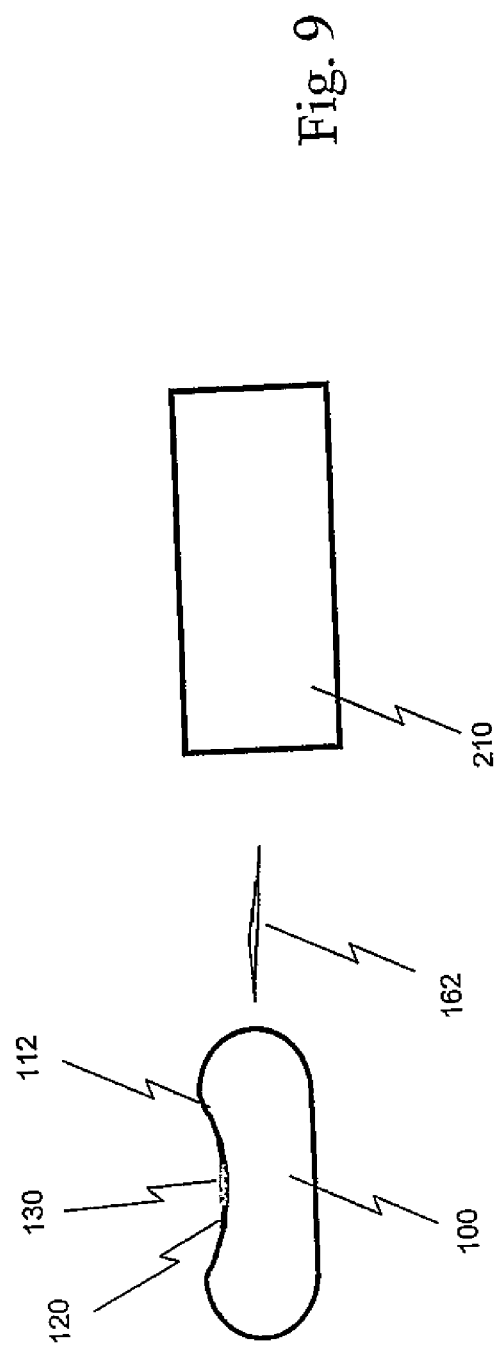
Fig. 8
Fig. 9